June 16, 1925.  
O. O. GREENWOOD  
SHADE FOR WINDSHIELD PROTECTORS  
Filed March 28, 1923  
1,541,942  
2 Sheets-Sheet 1

Othello O. Greenwood INVENTOR.

BY

Gardner W. Pearson ATTORNEY.

June 16, 1925.
O. O. GREENWOOD
SHADE FOR WINDSHIELD PROTECTORS
Filed March 28, 1923    2 Sheets-Sheet 2
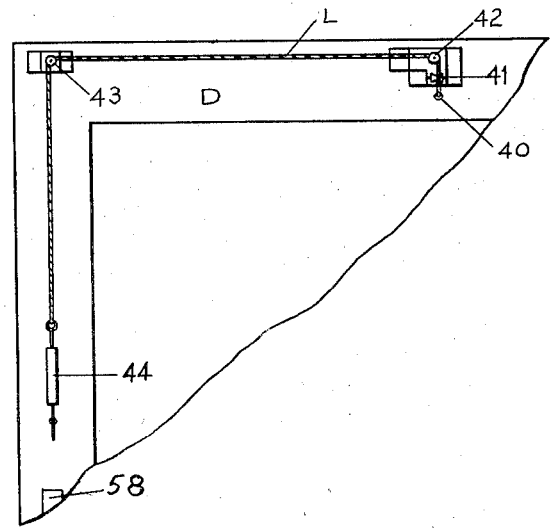
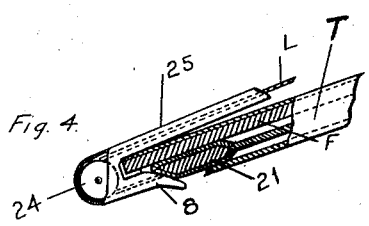
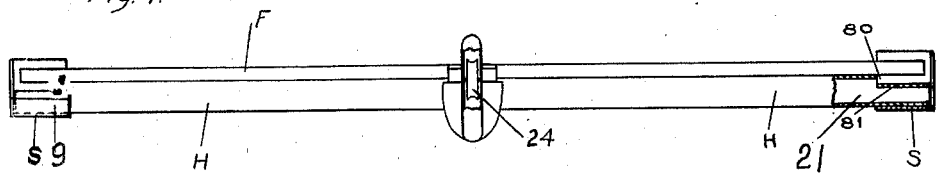
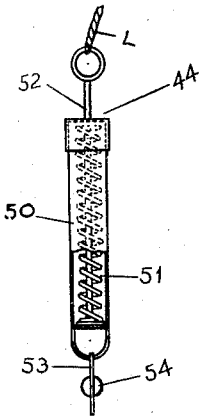
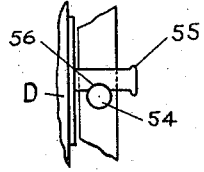
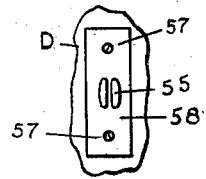
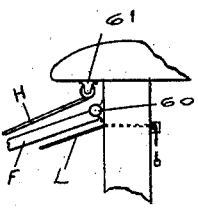
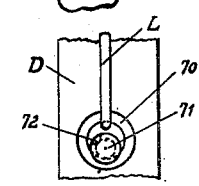
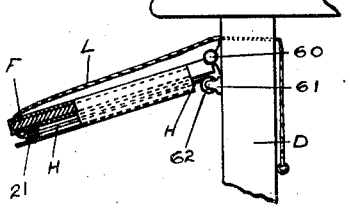
INVENTOR.
Othello O. Greenwood
BY
Gardner W. Pearson
ATTORNEY.

Patented June 16, 1925.

1,541,942

UNITED STATES PATENT OFFICE.

OTHELLO O. GREENWOOD, OF LOWELL, MASSACHUSETTS.

SHADE FOR WINDSHIELD PROTECTORS.

Application filed March 28, 1923. Serial No. 628,352.

*To all whom it may concern:*

Be it known that I, OTHELLO O. GREENWOOD, a citizen of the United States, residing at Lowell, in the county of Middlesex and State of Massachusetts, have invented certain new and useful Improvements in Shades for Windshield Protectors, of which the following is a specification.

This invention relates to shades or protectors such as used to protect transparent wind-shields of automobiles from rain and snow and to protect the driver from the glare of the sun, particularly when the sun is low and the driver is going towards it.

These protectors are sometimes fixed above the wind-shield and are sometimes adjustable. They are sometimes opaque and sometimes made of transparent glass, and there is another type which consists of a flexible shade which can be rolled up on a roller fixed above the wind-shield and extended out to the front by means of suitable arms.

My invention is intended for use with glass protectors which are either fixed or adjustable and whose principal purpose is to prevent the vertical wind-shield through which the driver looks in driving from being obscured by rain or snow.

The particular purpose of my invention is to provide a roller shade underneath such a glass protector which can instantly be rolled up out of the way or drawn down into place under such glass protector to keep the glare of the sun out of the rider's eyes on sunny days.

My device therefore makes such protectors useful for sunny days as well as stormy days.

In the drawings, Fig. 1 is a front perspective view showing part of an automobile with a glass wind-shield protector and with a shade of my construction in position.

Fig. 3 is a fragmentary view from the inside of a wind-shield showing the pull cord and catch of my preferred construction.

Fig. 4 is a side elevation, partly in section, showing a slight modification of the guideways.

Figs. 5 and 6 are side elevations showing different forms of pull bars.

Fig. 7 is an elevation as from the front of Fig. 2 looking in the direction of the arrow, some parts being broken away to show the construction.

Fig. 8 is a detail of the spring catch.

Fig. 9 is a side elevation of the spring catch in place on the split pin.

Fig. 10 is a front view of the split pin.

Fig. 11 is a side elevation showing a modified construction of my window shade, and Fig. 12 is another side elevation showing another modification.

Fig. 13 is a detail of a simplified holder for holding my shade in open position.

Figure 1:
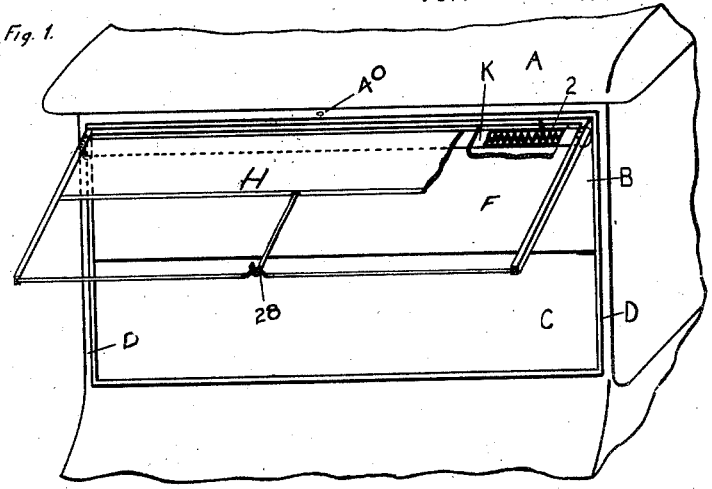

In the drawings, A represents the top of an automobile and B represents the top glass of a windshield, while C represents the bottom glass and D, D represent the side frame at the front which supports the windshield.

F represents the transparent windshield protector shown as made of glass of a common type and pivoted at 10 to the windshield frame. This protector can be adjusted by means of the curved arm 11 and set screw 12 in a well known manner.

At each side, attached to protector F, I locate the guideways S, S each of which supports a roller bracket 20, 20. Between these roller brackets 20 is hung a spring shade roller K supported by spindles 3, 3 and having a spring 2 which tends to keep the shade H carried by the roller normally rolled up. At the end of the shade H is the pull bar 21.

These guideways S, S serve to keep the pull bar 21 and shade H in place and close under the glass F when they are pulled down by means of the cord L.

Near the front center of protector F is the frame 23 which carries a pull cord roller 24 and, preferably, extends back to a tube 25 supported at the upper end by a leg 26. Pull cord L is attached to pull bar 21 and extends around roller 24 and through tube 25, thence preferably over a small pulley 38, thence through hole 40 up and over pulleys 41 and 42 over towards the left of the windshield frame over another pulley 43 and thence down to a holder 44.

As shown, this holder includes a barrel 50 inside of which is a spring 51 which extends around a headed rod 52 attached to cord L. At the bottom of barrel 50 is a strip 53 on which is a ball 54 so arranged that it can fit under a split pin 55 into which 53 can pass, and under a curved part 56 in which ball 54 can rest. Pin 55 is carried by a plate 58 attached by screws 57.

Instead of a spring holder such as just described, I can use a ring 70 attached to the end of cord L which can be engaged or disengaged with a groove 32 in a button or stud 71 fixed to side frame D.

It is obvious that by pulling on the cord L and thus pulling out the pull bar and shade, the transparent protector can be turned into an opaque protector when driving in to the sun.

Figure 2:
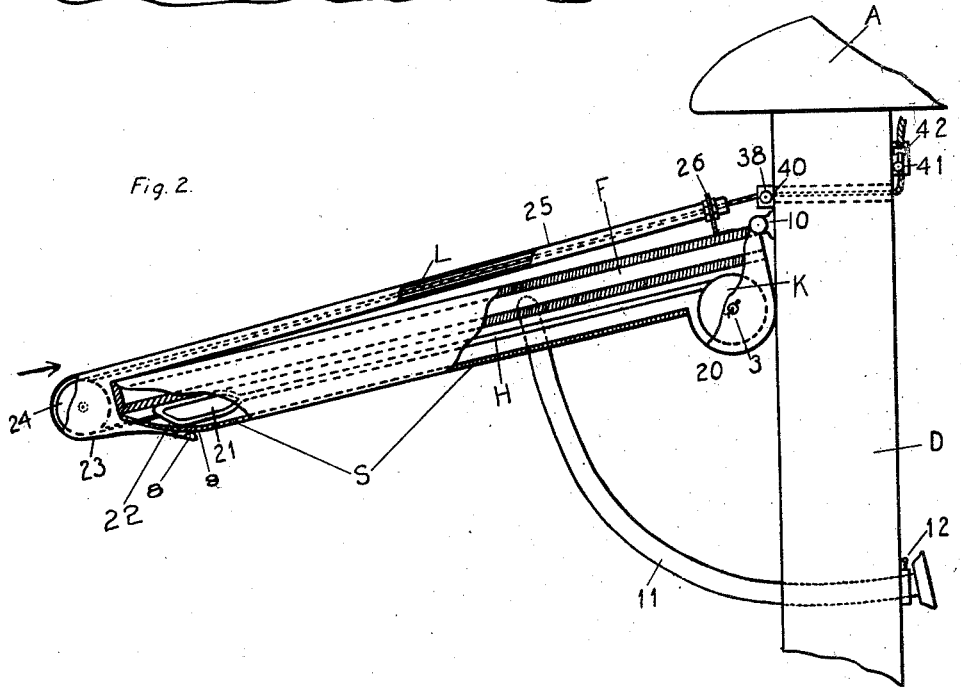
Fig. 2 is a side elevation showing my preferred form of shade in position, with parts broken away to show the construction. In this view, the thickness of the cloth and metal is exaggerated to make the construction clearer.

Preferably, the lower end of each guideway S is bent upward at 9 as shown in Fig. 2, whereby the ends of the pull bar are checked and forced up close to the glass F and there is a tongue or lip 8 extending down and back under glass F from frame 23 which forces the middle part of the pull bar 21 up against the glass thereby preventing the wind from getting in underneath and causing trouble. These members 8 and 9 serve as pull bar checks.

Instead of a wooden pull bar, I may, as shown in Fig. 5 use a flat metal bar 60 or, as shown in Fig. 6 at 61, a piece of brass bent so as to form a tube.

In the construction shown in Fig. 1, the tube 25 for cord L is omitted as well as the pulley 24 and the guides or pull bar checks 8 and 9. The cord L in this case passes over the edge of the glass F or preferably, through a groove 28.

Preferably, pull bar 21 is beveled or tapered at 22 to fit snugly against pull bar checks 8 and 9.

To cause the whole pull bar, such as 21, to fit snugly under glass F, it may be cut away at each end at 81 to fit into the middle member 80 of each guideway S as shown in Fig. 9, or the middle member 81 may be omitted in a guideway T, as shown in Fig. 4, otherwise similar to S.

In Fig. 11, I show a construction wherein the roller brackets 61 carrying spring roller 62 are attached to the wind-shield frame instead of to the guideways.

There are no pull bar checks and there is no pulley.

In Fig. 12, I show a construction wherein the roller brackets are carried by the wind-shield frame above the wind-shield protector, to guideways being also above instead of below.

I intend to cover all such combinations of transparent wind-shield protectors with a shade carried by a spring roller regardless of whether or not the roller is above or below the protector or whether or not its brackets are carried thereby or by the windshield frame.

I claim:

1. In an automobile having a wind-shield frame, the combination with an adjustable transparent wind-shield protector, of pull bar checks and guideways at each side carried by said protector, each guideway supporting a roller bracket, a spring roller supported by said brackets, an opaque shade carried by said spring roller having a pull bar slidable in the guideways and of a size to fit in behind the pull bar checks, a pulley carried at the front of the protector, a shade pull-cord attached to the pull bar and extending around said pulley back through the wind-shield frame, and means to fasten said cord in position.

2. In an automobile having a wind-shield frame, the combination with a transparent wind-shield protector, of guideways at each side carried by said protector, spring roller brackets, a spring roller supported by said brackets, a shade carried by said spring roller having a pull bar slidable in the guideways, a pulley carried at the front of the protector, a shade pull-cord attached to the pull bar and extending around said pulley back through the wind-shield frame.

3. In an automobile having a wind-shield frame, the combination with an adjustable transparent wind-shield protector, of pull bar guideways at each side carried by said protector, which end in upwardly slanting pull bar checks, each guideway supporting a roller bracket, a spring roller supported by said brackets, an opaque shade carried by said spring roller having a pull bar slidable in the guideways and of a size to fit in behind the pull bar checks, a cord tube extending from the top to the bottom of the protector, a pulley at the front thereof and an upwardly slanting pull bar check tongue at the bottom thereof, a shade pull-cord attached to the pull bar and extending around said pulley back through the cord tube and wind-shield frame, and means to fasten said cord in position.

OTHELLO O. GREENWOOD.